(12) United States Patent
Halope et al.

(10) Patent No.: US 7,323,995 B2
(45) Date of Patent: Jan. 29, 2008

(54) SECURE RADIO FREQUENCY IDENTIFICATION DEVICE FOR IDENTITY BOOKLET OR OBJECT TO BE IDENTIFIED

(75) Inventors: Christophe Halope, Cannes (FR); Patrick Sure, Grasse (FR)

(73) Assignee: Ask S.A., Valbonne (FR)

( * ) Notice: Subject to any disclaimer, the term of this patent is extended or adjusted under 35 U.S.C. 154(b) by 398 days.

(21) Appl. No.: 11/149,144

(22) Filed: Jun. 10, 2005

(65) Prior Publication Data

US 2005/0275540 A1     Dec. 15, 2005

(30) Foreign Application Priority Data

Jun. 11, 2004     (FR)     .................................. 04 06353

(51) Int. Cl.
*G08B 13/14* (2006.01)

(52) U.S. Cl. .............. 340/572.7; 340/572.8; 340/572.9

(58) Field of Classification Search ............ 340/572.1, 340/572.3, 572.7, 572.8, 572.9, 571, 568.5, 340/568.6, 568.7; 235/375, 384, 385; 343/866, 343/895
See application file for complete search history.

(56) References Cited

U.S. PATENT DOCUMENTS

| | | | |
|---|---|---|---|
| 5,898,370 A * | 4/1999 | Reymond | 340/540 |
| 6,255,951 B1 | 7/2001 | De La Huerga | 340/573.1 |
| 6,404,643 B1 * | 6/2002 | Chung | 361/737 |
| 6,421,013 B1 * | 7/2002 | Chung | 343/700 MS |
| 6,886,246 B2 * | 5/2005 | Chung | 29/832 |
| 7,048,179 B2 * | 5/2006 | Claessens et al. | 235/375 |
| 7,098,794 B2 * | 8/2006 | Lindsay et al. | 340/572.3 |
| 7,102,519 B2 * | 9/2006 | Lyon et al. | 340/572.1 |
| 2004/0104274 A1 | 6/2004 | Kotik et al. | 235/492 |

FOREIGN PATENT DOCUMENTS

| | | | |
|---|---|---|---|
| DE | 00114819 A | * | 1/2002 |
| EP | 0 899 683 | | 3/1999 |
| JP | 2005196377 A | * | 7/2005 |
| WO | WO 01/20564 | | 3/2001 |
| WO | WO 02/077939 | | 10/2002 |

* cited by examiner

*Primary Examiner*—Van T. Trieu
(74) *Attorney, Agent, or Firm*—James C. Lydon

(57) ABSTRACT

The invention concerns a radio frequency identification device (RFID) including a chip (12) and an antenna (10) connected together on a support, the antenna being printed onto the support and the support being fixed to an object with an added attachment means. According to the main characteristic, the attachment means overlaps at least once at least one turn of the antenna so that the radio frequency identification device (RFID) is destroyed if the support is detached from the object without the attachment means being removed.

10 Claims, 1 Drawing Sheet

SECURE RADIO FREQUENCY IDENTIFICATION DEVICE FOR IDENTITY BOOKLET OR OBJECT TO BE IDENTIFIED

BACKGROUND OF THE INVENTION

This invention concerns radio frequency identification devices for identifying persons or objects and particularly concerns a secure radio frequency identification device for its identity booklet or object to be identified.

Contactless Radiofrequency Identification Devices (RFIDs) are increasingly used for identification of persons moving about in controlled access zones or transiting from one zone to another or for identification of objects. A contactless RFID is a device made up of an antenna and a chip connected to the antenna. The chip is usually not powered and receives its energy through an electromagnetic coupling between the antenna of the reader and the antenna of the RFID. Information is exchanged between the RFID and the reader and particularly information stored in the chip. This information may also relate to the identification of the holder of the personalized object on which the RFID is located and his/her authorization to enter into a controlled access zone for example, or it can relate to the identification of an object and the management of its transportation from the production site to the place of sale, for example.

Thus, contactless RFIDs can be incorporated into identity booklets such as passports for identifying their holders. The chip memory contains information such as the identity of the passport holder, his/her country of origin, his/her nationality, visas of different countries visited, dates of entry, restrictions of movements, etc. Such a passport is described in the U.S. Pat. No. 5,528,222 and in the patent application WO/00/26856. In these documents, the RFID is incorporated into the passport's top cover board. It is usually inserted between the reinforced cover board and the flyleaf of the quire of passport pages, which is laminated to the back of the reinforced top cover board.

Unfortunately, it is relatively easy for a fraudulent individual to tamper with such a passport and make a forged passport from it. The fraudulent individual simply needs to remove the flyleaf to have access to the RFID and to, either replace the cover by a new cover including another RFID, or merely replace the chip by another chip so that the information supplied by the RFID corresponds to the information contained in the forged passport.

This is why the object of the invention is to provide a RFID linked securely to the object such that it cannot be removed from the object and be replaced by another.

BRIEF SUMMARY OF THE INVENTION

The object of the invention is thus a radio frequency identification device (RFID) including a chip and an antenna connected together on a support, the antenna being printed onto the support and the support being fixed to an object with an added attachment means. According to the main characteristic, the attachment means overlaps at least once at least one turn of the antenna so that the radio frequency identification device (RFID) is destroyed if the support is detached from the object without the attachment means being removed.

BRIEF DESCRIPTION OF THE DRAWINGS

The purposes, objects and characteristics of the invention will become more apparent from the following description when taken in conjunction with the accompanying drawings in which.

DETAILED DESCRIPTION OF THE INVENTION

Figure 1:
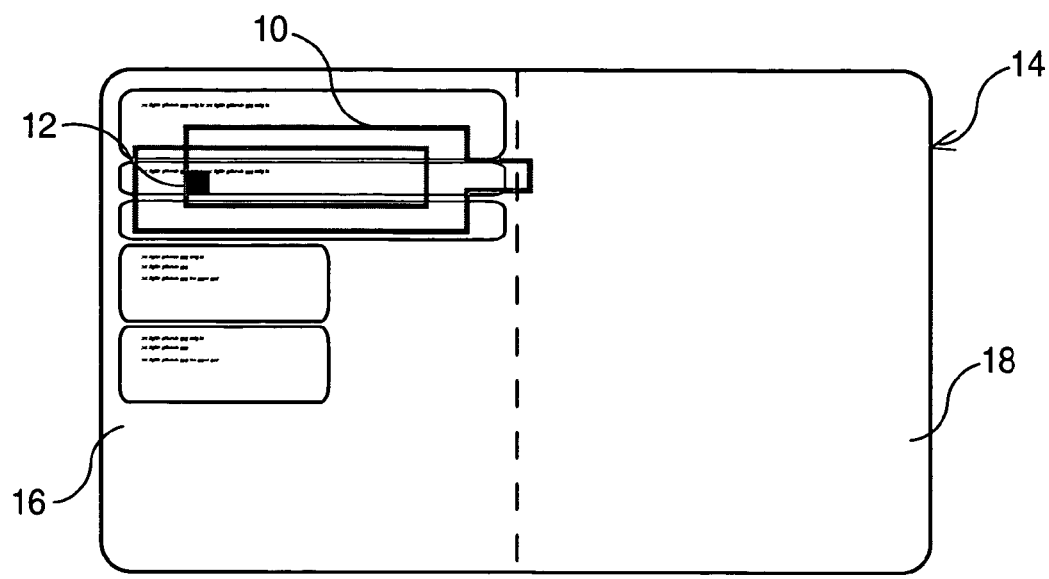
FIG. 1 represents the RFID on its support designed to be inserted into an identity booklet such as a passport according to the preferred embodiment of the invention.

In reference to FIG. 1, the radio frequency identification device (RFID) is located on an object that is an identity booklet such as a passport according to the preferred embodiment of the invention. The support of the RFID is one of the 14 sheets making up the quire of the passport. The RFID mainly contains an antenna 10 and a chip 12 connected together. The antenna is preferably made with a screen deposit of conductive ink containing metal particles such as silver but can be made with a glued metal strip or by other means without deviating from the scope of the invention. The antenna can be made, for example, by screen printing, flexography, rotogravure, offset printing or inkjet printing.

The sheet 14 is fixed to the passport with an added attachment means that connects all the sheets that make up the passport to one another. The linking of sheets to one another is done usually by sewing. The RFID is placed on part 16 of the antenna 14 support located on the left of the fold line 20 of the sheet 14 on which the attachment means will be fitted as well as on part 18 located on the right of line 20. As shown in FIG. 1, the major part of the RFID is located on the part 16 located to the left of the line 20 of the sheet 14. A different device in which the major part of the device is located on the right side 18 is also possible.

The major part of the RFID can be located on the page comprising the part containing the variable items relating to the identity of the person such as his/her surname, his/her name, his/her photo, etc. In this way, the RFID will be protected by the safety film placed on the variable items once these are entered. The shape of the antenna is such that at least one of its turns crosses the location (in the case of the passport this location is the fold line) on which the means for attaching the sheets to one another, and thus the sheet 14 to the other sheets, must be fitted.

The attachment means is preferably added after the antenna is installed on its support and is made with a secure thread. The thread then passes through all sheets of the passport several times along their fold line and also passes through the sheet 14 on the fold line 20.

Figure 2:
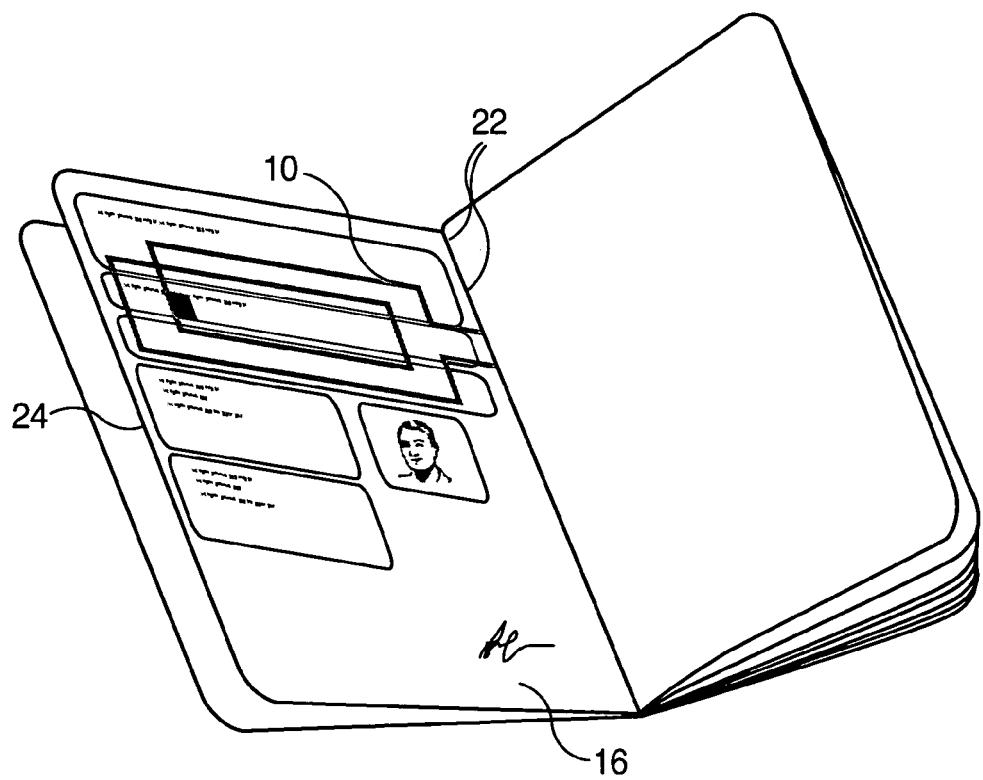
FIG. 2 represents the passport seen from an angle and its associated RFID.

According to FIG. 2 that shows a perspective view of the finalized passport, the most important part of the RFID comprising the major part of the antenna 10 and the chip 12 is located on page 16 which contains the variable items and is protected by a safety film 24. The sewing 22 was done along the fold line 20 of all pages that make up the passport. The part of the antenna located on the other side of the sewing is not visible as the antenna 10 disappears under the right-hand page adjacent to page 16 and under the quire comprising the passport. In this manner, on this figure, it is clearly shown that the sewing 22 overlaps (that is crosses by going over) at least once the turn of the antenna and in case the page 16 of the passport is removed, the antenna is broken and the RFID destroyed. Furthermore, to remove the antenna support and therefore page 16 of the passport, the page 16 is torn or cut out along the location of the attachment means thus along the sewing without the latter being taken out. The thread may be replaced by another attachment means such as gluing, welding, riveting or other means without deviating from the scope of the invention. The thread or the attachment means overlaps the antenna by crossing the antenna longitudinally.

Thus, due to this arrangement of the attachment means in relation to the antenna, the only way to detach the antenna support of the passport without destroying the RFID is to remove the attachment means of the passport and therefore to remove the passport thread.

The dimension of the antenna 10 is such that the antenna can properly transmit and receive information from a reader when the object to which it is connected is within the reader's field. In this way, one of the turns of the antenna 10 can have the dimension of the page 16 of the passport. In case the turn of the antenna is located in the zone provided for the passport number, the antenna may get perforated during laser punching of the passport. This perforation is not a problem and may, on the contrary, add a safety element associated to the RFID as it will physically bear the passport number.

According to a second embodiment of the invention, the radio frequency identification device (RFID) is made on a support such as a label that is itself secured on any object to be identified. The label is made of paper, cloth, plastic or other material. The object to be identified may be a piece of clothing, packaging or other. The label therefore includes an antenna and a chip connected together, the antenna being preferably screen printed on its support.

The antenna (therefore the label) support is then attached to the object thanks to an attachment means such as a stitch, a weld, a glued bond, a rivet or other. The attachment means is thus made on a part of the antenna support and preferably along a line. The location of the attachment means, that is the location where the support is linked to the object is such that it crosses over at least once at least one turn of the antenna so that the attachment means overlaps the antenna. In this way, in the case of an object designed for sale, the label can be torn off intentionally at the time of sale and is detached from the object along the attachment means. In this way, the antenna is inevitably cut and the RFID is destroyed which thus guarantees the inability to reuse the RFID and this also ensures that no information is retained against the buyer's will.

In general, be it for a passport or a label, the attachment means may be made in such a way that the antenna is partially perforated at the time of installing the attachment means. Thus, in the case of the passport, the secure thread passes through the turn of the antenna.

The invention claimed is:

1. A radio frequency identification device (RFID) including a chip and an antenna connected together on a support, said antenna being printed onto said support and said support being fixed to an object with an added attachment means,
    characterized in that said attachment means overlaps at least once at least one turn of said antenna so that the radio frequency identification device (RFID) is destroyed if the support is detached from the object without the attachment means being removed.

2. The device according to claim 1, in which the printing type of said antenna is screen printing.

3. The device according to claim 1, in which said object is a passport and said support is a sheet of said passport.

4. The device according to claim 1, in which said chip and the major portion of the antenna are located on the page of said passport on which are printed the variable items relating to the identity of the person.

5. The device according to claim 1, in which one of the turns of said antenna is perforated during laser punching of the passport number.

6. The device according to claim 1, in which said object is any object to be identified and said support is a label.

7. The device according to claim 1, in which said attachment means is sewing.

8. The device according to claim 1, in which said attachment means is a weld.

9. The device according to claim 1, in which said attachment means is gluing.

10. The device according to claim 1, in which said attachment means is riveting.

* * * * *